(Model.)

H. F. SAWTELLE.
DOOR ROLLER.

No. 364,963. Patented June 14, 1887.

Witnesses
T. Walter Fowler.
D. S. Clark,

Inventor
Henry F. Sawtelle.

By his Attorneys
A. H. Evans and Co.

UNITED STATES PATENT OFFICE.

HENRY F. SAWTELLE, OF LEOMINSTER, MASSACHUSETTS.

DOOR-ROLLER.

SPECIFICATION forming part of Letters Patent No. 364,963, dated June 14, 1887.

Application filed October 22, 1885. Serial No. 180,622. (Model.)

*To all whom it may concern:*

Be it known that I, HENRY F. SAWTELLE, a citizen of the United States, residing at Leominster, in the county of Worcester and State of Massachusetts, have invented certain new and useful Improvements in Door-Rollers, of which the following, taken in connection with the accompanying drawings, is a specification.

My invention relates to certain improvements in anti-friction rollers or trucks for sliding or folding doors, the object being to produce a roller on a positive anti-friction principle, and one that will be inexpensive in construction.

The invention is constructed as follows, reference being had to the accompanying drawings, forming a part of this specification, in which similar letters of reference refer to similar parts wherever they occur on the different parts of the drawings.

Figure 1:
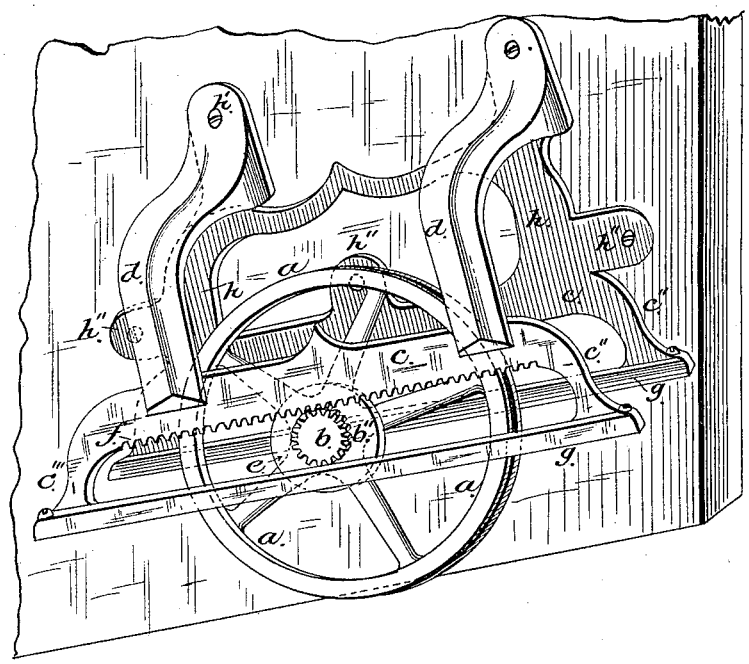
Figure 2:
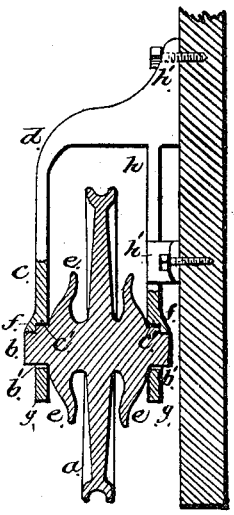
Figure 3:
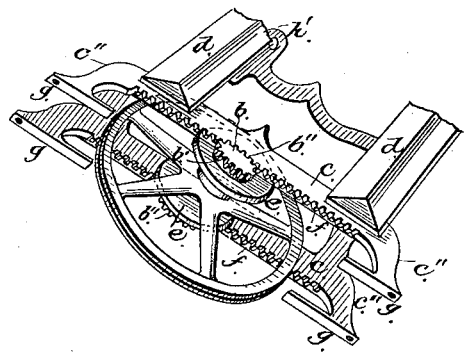

Figure 1 represents a perspective view of the invention, with a portion of the door to which it is attached; Fig. 2, a sectional view of the roller, together with a sectional view of a portion of the door; and Fig. 3, a bottom view of the roller.

$a$ represents the track-wheel, and as the door is opened or closed traverses the track-rail that is laid beside the bottom of the door. The rim of the wheel may be grooved in order to fit the common half-round or inverted V-shaped track-rail now in general use, or may be formed in any shape, enabling it to be used with any modified track-rail that may be employed.

$b$ indicates the axle that is connected with the track-wheel $a$. This axle may be made integral with the wheel. The axle $b$ projects a sufficient distance on either side of the center or hub of the track-wheel $a$ to enable the riding-rails $c\ c$ to rest upon it, in order that when the track-wheel $a$ traverses the track-rail the axle $b$ will traverse a circumferential proportional distance of the riding-rails $c\ c$, thus causing but a very small amount of friction. On the axle of the track-wheel $a$ are steadying-flanges $e\ e$. The axle $b$ is provided with a round smooth surface, $b'$, projecting outwardly a distance equaling the thickness of the smooth surface edge of the riding-rails $c'\ c'$, that rest directly upon it. The ends of the axle $b$ are provided with cogs $b''\ b''$, that engage the cogged track $f\ f$, as will be fully explained in a portion of this specification.

$c\ c$ represent the riding-rails, one on either side and parallel with the track-wheel $a$, and resting on and traversed by the axle $b$. The ends of the riding-rails have downward projections $c''\ c''$, preventing the axle $b$ from passing beyond its intended space. The inner portion of the lower edges of the riding-rails $c\ c$ have a straight smooth surface, $c'\ c'$, that rests directly on the smooth surface of the axle at $b'\ b'$, while at the outer side is formed the cogged tracks $f\ f$, that extend the entire length of the riders. It will be noticed that the base of the cogs are on a level with the smooth portion of the riding-rails $c'\ c'$, and therefore the entire weight is brought to bear upon the smooth portion of the axle $b'\ b'$.

The object of the cogged track, in combination with the cogs $b''\ b''$, is to prevent the axle from sliding longitudinally on the rider edges should the wheel come in contact with an obstruction on the track-rail. The inner sides of the riding-rails rest lightly against the hub of the track-wheel $a$, or against the steadying-flanges $e\ e$, thus steadying the movements of the track-wheel $a$ and preventing its easy derailment.

$d\ d$ indicate the arms that connect the inner riding-rail with the base $h\ h$. From the inner riding-rail they project upward a sufficient distance to clear the top of the track-wheel $a$ and then project over the track-wheel space and connect with the base $h\ h$, holding the inner riding-rail rigidly in position, strengthening the base, and leaving a clear space to be traversed by the track-wheel $a$. It will be noticed that at the ends of the riding-rails $c\ c$ there is nothing to prevent the outer portion of the track-wheel $a$ from passing out beyond the limit of the frame-work until the axle $b$ reaches the downward projections $c''\ c''$, which prevent its further passage. By this arrangement the roller is much lighter in construction, takes less space, and is much neater in design.

$g\ g$ indicate the guards, designed to hold the axle $b$ and track-wheel $a$ in position, and should the door be accidentally raised in opening or shutting, as might happen with very light doors, it would hold the track-wheel $a$ and axle $b$ in the position they were in when the door was raised, otherwise the wheel might slide to the lower portion of the axle-bed; or, if the door were raised sufficiently, it might pass out beyond the extremities of the riding-rails, necessitating its readjustment before it could be used.

At the lower part of the base $h\ h$ will be noticed the riding-rail $c$, constructed precisely like the outer one, that is attached to the arms $d\ d$, and in order that there may be sufficient room between it and the door to admit of the free movements of the axle $b$, I employ arms $h'\ h'$, that rest directly against and are attached to the door by means of bolts, screws, &c.

Having thus fully described the nature, operation, and general construction of my invention, I wish to secure by Letters Patent and claim—

In a door-roller, the riding-rails $c\ c$, provided with a smooth surface edge, $c'\ c'$, contiguous to and parallel with the longitudinal cogged track $f\ f$, in combination with the axle $b$, provided with the annular plain smooth portion $b'\ b'$ and the cogs $b''\ b''$, as and for the purpose set forth.

In testimony whereof I have signed my name to this specification, in the presence of two subscribing witnesses, on this 28th day of September, A. D. 1885.

HENRY F. SAWTELLE.

Witnesses:
CHAS. E. KNAPP,
GEO. B. MCNEAL.